United States Patent
Holness

(10) Patent No.: US 10,476,763 B2
(45) Date of Patent: Nov. 12, 2019

(54) SCALING OPERATIONS, ADMINISTRATION, AND MAINTENANCE SESSIONS IN PACKET NETWORKS

(71) Applicant: Ciena Corporation, Hanover, MD (US)

(72) Inventor: Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 135 days.

(21) Appl. No.: 15/479,547

(22) Filed: Apr. 5, 2017

(65) Prior Publication Data

US 2018/0295031 A1    Oct. 11, 2018

(51) Int. Cl.
| | |
|---|---|
| H04L 12/26 | (2006.01) |
| H04L 12/841 | (2013.01) |
| H04L 12/803 | (2013.01) |
| H04L 12/24 | (2006.01) |

(52) U.S. Cl.
CPC .......... *H04L 43/02* (2013.01); *H04L 41/5051* (2013.01); *H04L 41/5058* (2013.01); *H04L 43/00* (2013.01); *H04L 43/0829* (2013.01); *H04L 43/0852* (2013.01); *H04L 47/125* (2013.01); *H04L 47/28* (2013.01)

(58) Field of Classification Search
CPC . H04L 43/02; H04L 43/0829; H04L 41/5051; H04L 41/5058; H04L 43/0852; H04L 47/28; H04L 47/125; H04L 43/00
See application file for complete search history.

(56) References Cited

U.S. PATENT DOCUMENTS

| | | | |
|---|---|---|---|
| 8,737,198 B1 | 5/2014 | Holness et al. | |
| 9,025,435 B2 | 5/2015 | Holness et al. | |
| 2005/0068890 A1 | 3/2005 | Ellis et al. | |
| 2005/0068950 A1 | 3/2005 | Ellis et al. | |
| 2005/0071453 A1 | 3/2005 | Ellis et al. | |
| 2005/0099949 A1 | 5/2005 | Mohan et al. | |
| 2005/0099951 A1 | 5/2005 | Mohan et al. | |
| 2005/0099952 A1 | 5/2005 | Mohan et al. | |
| 2005/0099954 A1 | 5/2005 | Mohan et al. | |
| 2005/0099955 A1 | 5/2005 | Mohan et al. | |

(Continued)

FOREIGN PATENT DOCUMENTS

EP    2698948 A1    2/2014

OTHER PUBLICATIONS

Jul. 20, 2018 International Search Report issued for International Application No. PCT/US2018/023957.

(Continued)

*Primary Examiner* — Kwang B Yao
*Assistant Examiner* — Moo Jeong
(74) *Attorney, Agent, or Firm* — Clements Bernard Walker; Christopher L. Bernard; Lawrence A. Baratta, Jr.

(57) ABSTRACT

Operations, Administration, and Maintenance (OAM) scaling systems and methods are implemented by a network function performed by one of a physical network element and a virtual network element executed on one or more processors. The OAM scaling method includes providing N packet services, N is an integer; and, responsive to determined OAM session scaling limits, providing OAM sessions for the N packet services in an oversubscribed manner, wherein the determined OAM session scaling limits include M OAM sessions supported by the network function, M is an integer and less than N.

20 Claims, 9 Drawing Sheets

(56) References Cited

U.S. PATENT DOCUMENTS

| | | |
|---|---|---|
| 2006/0031482 A1 | 2/2006 | Mohan et al. |
| 2009/0059799 A1 | 3/2009 | Friskney et al. |
| 2010/0046533 A1 | 2/2010 | Kuramoto et al. |
| 2010/0135291 A1 | 6/2010 | Martin et al. |
| 2010/0165883 A1 | 7/2010 | Holness et al. |
| 2012/0233503 A1 | 9/2012 | Ozawa et al. |
| 2012/0243405 A1 | 9/2012 | Holness et al. |
| 2013/0114394 A1 | 5/2013 | Hu et al. |
| 2013/0329565 A1 | 12/2013 | Holness et al. |
| 2013/0332602 A1 | 12/2013 | Nakil et al. |
| 2014/0177439 A1 | 6/2014 | Holness et al. |
| 2017/0085488 A1* | 3/2017 | Bhattacharya ...... H04L 47/2425 |

OTHER PUBLICATIONS

IEEE, IEEE Standard for Local and metropolitan area networks—Virtual Bridged Local Area Networks, Amendment 5: Connectivity Fault Management, IEEE Computer Society, IEEE std 802.1ag-2007, New York, NY, Dec. 17, 2007, pp. 1-260.

MEF, Technical Specification MEF 30, Service OAM Fault Management Implementation Agreement, The Metro Ethernet Forum 2011, Jan. 2011, pp. 1-40.

International Telecommunication Union, ITU-T G.8013/Y.1731,Telecommunication Standardization Sector of ITU, Operation, administration and maintenance (OAM) functions and mechanisms for Ethernet-based networks, Aug. 2015, pp. 1-102.

* cited by examiner

|  | MEASUREMENT CYCLE | | |
| --- | --- | --- | --- |
|  | MEASUREMENT WINDOW | | C |
|  | A | B |  |
| TIME SLOT | 1 | 2 | 3 |
| EVC SET MEASUREMENT WINDOW (SEC) | 300 | 300 | 300 |
| MEASUREMENT CYCLE (SEC) | $\Delta t = 900$ | | |
| E.G., # OF EXISTING EVCS IN EACH TIME SLOT | 180 | 350 | 60 |
| # OF Y.1731 EXISTING SESSION IN EACH TIME SLOT | 710 | 700 | 720 |

*FIG. 7*

SCALING OPERATIONS, ADMINISTRATION, AND MAINTENANCE SESSIONS IN PACKET NETWORKS

FIELD OF THE DISCLOSURE

The present disclosure generally relates to packet networking systems and methods. More particularly, the present disclosure relates to systems and methods to scale Operations, Administration, and Maintenance (OAM) sessions in packet networks.

BACKGROUND OF THE DISCLOSURE

Layer 1 (Time Division Multiplexing) OAM sessions are continuous, operating through various overhead bytes in TDM frames (e.g., Optical Transport Network (OTN)). In packet networks, OAM sessions are not continuous through overhead bytes, but rather via periodic frame or Protocol Data Unit (PDU) transmission. Examples of packet layer OAM include IEEE 802.1ag Connectivity Fault Management (CFM), ITU Recommendation G.8013/Y.1731 "Operations, administration and maintenance (OAM) functions and mechanisms for Ethernet-based networks," (08/15), and the like. Specific examples of OAM PDUs/frames include Continuity Check Messages (CCMs), Delay Measurements (e.g., Delay Measurement Message (DMM) and Delay Measurement Reply (DMR), Loss Measurements (e.g., Loss Measurement Message (LMM) and Loss Measurement Reply (LMR)), and the like. Disadvantageously, it is not atypical for the scale of OAM sessions supported by a network device or function does not keep pace with the number of services the network device or function can support. For example, a network device may support over 64,000 concurrent sessions, but the network device simply does not have the processing capacity, memory, etc. to support actively and concurrently monitoring anywhere close to 64,000 OAM sessions. For physical network devices, the conventional approach to scaling OAM sessions includes adding additional hardware (e.g., Field Programmable Gate Arrays (FPGAs), Network Processing Units (NPUs), etc. For Virtual Network Functions (VNFs), the conventional approach to scaling OAM sessions include adding additional processing cores. However, these approaches are inefficient, often not feasible, and waste existing network resources already deployed. Thus, existing network devices either require extra hardware to scale OAM, have to offer fewer services to match the OAM scale with existing hardware, or have to operate services without active OAM monitoring.

BRIEF SUMMARY OF THE DISCLOSURE

In an exemplary embodiment, an Operations, Administration, and Maintenance (OAM) scaling method implemented by a network function performed by one of a physical network element and a virtual network element executed on one or more processors includes providing N packet services, N is an integer; and responsive to determined OAM session scaling limits, providing OAM sessions for the N packet services in an oversubscribed manner, wherein the determined OAM session scaling limits include M OAM sessions supported by the network function, M is an integer and less than N. The OAM scaling method can further include automatically determining the determined OAM session scaling limits by the network function based on the N packet services, a measurement cycle, and a session scale for each of the OAM sessions. The OAM sessions can include one or more delay measurements and loss measurements performed through associated Packet Data Unit (PDUs). The OAM scaling method can further include automatically creating service sets based on the determined OAM session scaling limits; and assigning each of the OAM sessions to one of the service sets, wherein the providing the OAM sessions is based on the service sets.

The assigning can be performed to balance a number of the OAM sessions in each of the service sets. The OAM scaling method can further include providing results of the OAM sessions for a plurality of measurement cycles periodically to a management system. The providing the OAM sessions can include performing each of the OAM sessions in each of the service sets over an associated measurement window in a first measurement cycle; and performing each of the OAM sessions in a different order in a second measurement cycle. The different order can include one or more of performing each of the service sets in a different time slot in the second measurement cycle and performing each of the OAM sessions in an associated service set in a different order between the first measurement cycle and the second measurement cycle. The OAM sessions can include a first set of OAM sessions and a second set of OAM sessions, wherein the providing the OAM sessions can include providing the first set of OAM sessions in the oversubscribed manner, and the method can further include providing the second set of OAM sessions in a non-oversubscribed manner.

In another exemplary embodiment, a network device configured to perform Operations, Administration, and Maintenance (OAM) scaling includes a data plane configured to switch packets; and a control plane communicatively coupled to the data plane, wherein the control plane includes one or more processors configured to: manage N packet services, N is an integer; and, responsive to determined OAM session scaling limits, manage OAM sessions for the N packet services in an oversubscribed manner, wherein the determined OAM session scaling limits can include M OAM sessions supported by the network function, M is an integer and less than N. The control plane can include one or more processors configured to automatically determine the determined OAM session scaling limits by the network function based on the N packet services, a measurement cycle, and a session scale for each of the OAM sessions. The OAM sessions can include one or more delay measurements and loss measurements performed through associated Packet Data Unit (PDUs).

The control plane can include one or more processors configured to automatically create service sets based on the determined OAM session scaling limits; and assign each of the OAM sessions to one of the service sets, wherein the OAM sessions are managed based on the service sets. Each of the OAM sessions can be assigned to balance a number of the OAM sessions in each of the service sets. The control plane can include one or more processors configured to provide results of the OAM sessions for a plurality of measurement cycles periodically to a management system. For management of the OAM sessions, wherein the control plane can include one or more processors configured to perform each of the OAM sessions in each of the service sets over an associated measurement window in a first measurement cycle; and perform each of the OAM sessions in a different order in a second measurement cycle. The different order can include one or more of performing each of the service sets in a different time slot in the second measurement cycle and performing each of the OAM sessions in an associated service set in a different order between the first measurement cycle and the second measurement cycle. The OAM sessions can include a first set of OAM sessions and a second set of OAM sessions, wherein the first set of OAM sessions can be managed in the oversubscribed manner, and wherein the control plane can include one or more processors configured to manage the second set of OAM sessions in a non-oversubscribed manner.

In a further exemplary embodiment, an Operations, Administration, and Maintenance (OAM) scaling apparatus is associated with a network function performed by one of a physical network element and a virtual network element executed on one or more processors. The OAM scaling apparatus includes circuitry configured to provide N packet services, N is an integer; and circuitry configured to provide OAM sessions for the N packet services in an oversubscribed manner responsive to determined OAM session scaling limits, wherein the determined OAM session scaling limits include M OAM sessions supported by the network function, M is an integer and less than N. The OAM apparatus can further include circuitry configured to automatically create service sets based on the determined OAM session scaling limits; and circuitry configured to assign each of the OAM sessions to one of the service sets, wherein the OAM sessions are provided based on the service sets.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a table of a measurement cycle with three measurement windows similar to the table of FIG. 5;

DETAILED DESCRIPTION OF THE DISCLOSURE

Figure 1:
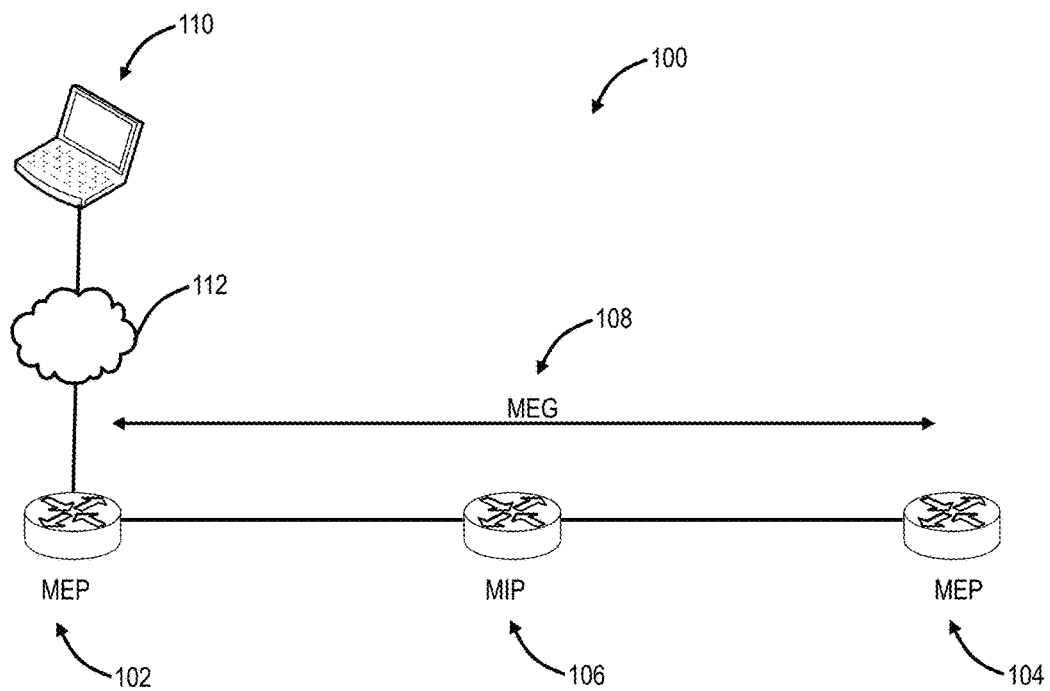
FIG. 1 is a network diagram of an exemplary Ethernet network configured with Ethernet OAM mechanisms.

Again, in various exemplary embodiments, the present disclosure relates to systems and methods to scale Operations, Administration, and Maintenance (OAM) sessions in packet networks. Specifically, the systems and methods provide an OAM session (e.g., CFM/Y.1731) distribution technique that (physical and virtual) network functions can support to increase the service coverage being actively performance monitored within a network. Again, it is not atypical that the level of OAM scale that can be supported by a network function does not keep pace with the number of services that the network function can support. In general, there are typically multiple concurrent OAM sessions that are needed per service within a network function. For example, there may be multiple (e.g., 3 to 8 per Class of Service (CoS)) delay and delay variation sessions and multiple (e.g., 3 to 8 per CoS) loss and loss ratio sessions, and a connectivity check session is needed per service. The OAM session scale quickly becomes staggering for a network function to provide.

As such, a staggering technique is being proposed to address the increasing scaling demands on network functions (i.e., network elements). The systems and methods allow the network function to partition the services (e.g., Ethernet Virtual Circuits (EVCs)) with the multiple concurrent and simultaneous OAM sessions. The OAM sessions associated with each partitioned service set is executed within a "measurement window." At the end of each "measurement window," the next service partitioned set OAM sessions are run, for its "measurement window." This continues until the complete set of services have their OAM sessions executed. Specifically, the systems and methods recognize that OAM functions in a packet network are performed with associated frames/PDUs to take appropriate measurements. These measurements are scaled using the measurement window to enable support for more OAM sessions. Accordingly, the systems and methods support oversubscription of OAM for packet services with service provider controlled confidence. As such, the aforementioned scaling problem is addressed without requiring additional hardware or new network equipment. A network function (whether virtual or physical) automatically computes its OAM session scaling limits and auto-creates service sets where concurrent OAM sessions can be run for each service in the service set. Further, the network function determines the "measurement window" that can be used to make these measurements such that the "measurement cycle" specified by the management system is an aggregate of multiple "measurement windows."

The systems and methods recognize OAM measurements for packet services are statistical in nature since these OAM measurements are based on frames/PDUs which are periodically transmitted. Note, this is dissimilar to TDM measurements which are continuous being part of the overhead of every frame transmitted. Since the OAM measurements are statistical in nature, the systems and methods include a staggering technique to scale OAM sessions without requiring additional hardware, allowing OAM sessions to match overall service ability. Statistically, over time, the staggering technique will converge with a high degree of certainty to actual. Further, per service performance monitoring OAM sessions are driven by Service Level Agreements (SLAs). Consequently, how stringent an SLA is written can be influenced by the level of performance monitoring, e.g., determined by the staggering technique. Further, the level of OAM measurements for packet services does not reach the same level as in TDM services since these TDM services are by definition monitored through overhead in every frame.

A network element can be configured to determine its own level of simultaneous concurrent OAM sessions that it can support based upon its inherent internal component capabilities. This scaling self-determination is used to determine "staggering" (i.e., per service OAM session partitioning) that needs to be done within the measurement window. Advantageously, the northbound management system does not have to change its instructions to the network element due to a network element [SW or HW] upgrade (which may introduce greater scaling capabilities) or the introduction of a new (more powerful) network element within the network. Operational simplicity is achieved for the Service Provider managing their network.

Exemplary Network

Referring to FIG. 1, in an exemplary embodiment, a network diagram illustrates an exemplary Ethernet network 100 configured with Ethernet OAM mechanisms. For illustration purposes, the Ethernet network 100 includes three interconnected network elements 102, 104, 106. The network 100 includes Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages exchanged between the network elements, specifically and in particular each Maintenance End Point (MEP) that provides origination and termination of the service transport path(s) for a MEG. The network elements 102, 104 are defined as a MEPs. In CFM, an MEP is configured to source and sink CFM/OAM frames, i.e. source and sink within a single configured MD (Maintenance Domain), pass-thru if MD Level is higher than the configured level for the MEP, and discard if MD Level is lower. The MEPs 102, 104 are also configured to participate in performance monitoring (OAM measurements) such as CCMs, Loss Measurement, Delay Measurement, etc. In a point-to-point network, there are two MEP nodes at the endpoints, and in other configurations, there may be multiple MEP nodes. Other topologies are also contemplated. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e., the MIP 106 is communicatively coupled between the MEPs 102, 104. A MIP is configured to process and forward CFM frames but does not initiate CFM frames. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g., the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), Multiprotocol Label Switching Transport Profile (MPLS-TP), and the like are also contemplated by the systems and methods described herein.

The systems and methods contemplate implementation and operation on Ethernet networks such as those compliant to IEEE 802.1ag-2007, G.8013/Y.1731, and/or Metro Ethernet Forum (MEF) specifications. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines an MEP as a Maintenance association End Point whereas G.8013/Y.1731 and MEF define an MEP as a Maintenance Entity Group End Point. In the following description, MEP may generally be referred to as a Maintenance End Point covering both the constructs of IEEE 802.1ag-2007, G.8013/Y.1731, MEF.

The network elements 102, 104, 106 are configured in a MEG 108 which enable a grouping of nodes in a maintenance group for OAM to be grouped on different spans. The MEG 108 (or an MA 108) is a set of MEPs, each configured with a same unique MEG ID code (UMC) and MEG Level or Maintenance Association Identifier (MAID) and Maintenance Domain (MD) level. The MEG 108 may be thought of as a full mesh a Maintenance Entities (MEs), the MEs including MEPs, MIPs, etc., with a set of MEPs configured therebetween. The UMC is a unique identifier for the MEG 108 domain. Additionally, the MEG 108 allows for nesting of various groups. The MEG Level and the MD is a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios. As described herein, the various systems and methods may be applied to per-node MEPs, per-interface MEPs, or per-port MEPs. Specifically, a per-node MEP applies to an entire network element whereas per-interface and per-port MEPs are for a single provisioned service on the network element.

The network 100 also includes a management system 110 communicatively coupled to the network elements 102, 104, 106 through a data communications network 112. The management system 110 can be a Network Management System (NMS), an Element Management System (EMS), a craft interface, etc. In an exemplary embodiment, the management system 110 is configured to provide OAM access to the network 100 as well as provisioning of services and the like. As described herein, the network 100 can use the staggering technique to scale OAM sessions supported on the network elements 102, 104, 106.

Y.1731 specifies OAM functions for performance monitoring of Ethernet networks enabling operators to meet SLAs. This can include, for example, Ethernet Loss Measurement (ETH-LM), frame delay and frame delay variation measurement function (ETH-DM), and the like. In Y.1731, OAM functions for performance monitoring allow measurement of three parameters—frame loss ratio, frame delay, and frame delay variation. These performance parameters apply to service frames, which conform to an agreed-upon level of bandwidth profile conformance. The ETH-LM function is used to calculate frame loss ratio of a connection such as between the network elements 102, 104. This ratio is the number of service frames not delivered, divided by the total number of service frames during a time interval. This calculation is performed by maintaining counters of received and transmitted service frames between the network elements 102, 104. The number of service frames not delivered is the difference between the number of service frames arriving at the ingress Ethernet flow point and the number of service frames delivered at the egress Ethernet flow point in a point-to-point Ethernet connection.

The ETH-LM can be performed as dual-ended and single-ended. In dual-ended, each MEP proactively sends periodic Continuity Check Message (CCM) frames to its peer MEP. Each peer MEP terminates the CCM frames and performs near-end and far-end loss measurements using local counters and counter values in the received CCM frames. In single-ended, an MEP sends an LM request (Loss Measurement Message (LMM)) frames to its peer MEP upon an on-demand administrative trigger. The peer MEP responds with LM reply (LMR) frames. Using counter values in LMR frames and its local counter value, an MEP performs near-end and far-end loss measurements.

The network elements 102, 104 can also perform frame delay and frame delay variation measurement functions (ETH-DM) by periodically sending frames with ETH-DM information to its peer MEP. An MEP receives frames with ETH-DM information from its peer MEP. MEPs can use one of two methods to perform ETH-DM, one-way ETH-DM or two-way ETH-DM. For one-way ETH-DM to work properly, peer MEPs must have synchronized clocks. The sending MEP sends Delay Measurement (DM) frames including timestamp at transmission time. The receiving MEP calculates the frame delay using the timestamp at the reception of the DM frame and the timestamp in the DM frame. For one-way frame delay variation measurement, clock synchronization on the peer MEPs is not required. The out-of-phase period can be removed by the difference of subsequent frame delay variation measurements. If clocks on peer MEPs are not synchronized, an MEP can measure frame delay using two-way ETH-DM. When two-way DM is enabled, an MEP sends ETH-DM request (Delay Measurement Message (DMM)) frames including timestamp at transmission time. The receiving MEP copies the timestamp into ETH-DM Reply (DMR) and sends that DMR back to the sending MEP. The sending MEP receives the DMR and calculates the two-way frame delay using the timestamp in the DMR and the timestamp at the reception of the DMR. Frame delay variation measurement is done by calculating the difference between two subsequent two-way frame delay measurements.

In an exemplary embodiment, the network 100 may utilize CCMs for end-to-end path protection (EEPP) fault detection and other functions. CCMs are polling-based, asynchronous, and bidirectional by way of two independent unidirectional keepalives. Each MEP 102, 104 sends a CCM frame periodically to its peer MEP 102, 104. All MEPs 102, 104 are configured with a periodic interval, and this is also signaled in the CCM frame for verification. Each MEP 102, 104 expects to receive a CCM frame by the end of that periodic interval. Non-receipt of a certain number of consecutive frames results in a fault. This fault is indicated by a Remote Defect Indication (RDI) bit of a CCM frame sent to a peer. This is useful for one-way fault conditions. The MEP 102, 104 exits a fault state only after receiving a certain number of consecutive CCM frames, each at the specified interval. Additionally, the CCM can detect misconnections by comparing MA and MEP identifiers (ID) from the frame with configured values. CCMs may be used per VLAN per MEG/MA level. Each CCM is sent at the highest priority and is ineligible for discard. For scaling purposes of CCM processing, some level of hardware support is typically utilized. Note, MIPs 106 conventionally do not terminate CCM frames, but rather simply forward them along based on frame forwarding criteria in the path (i.e., VLAN swap for VLAN cross-connects, destination MAC plus VLAN based forwarding for bridge path, etc.).

Network Element

Figure 2:
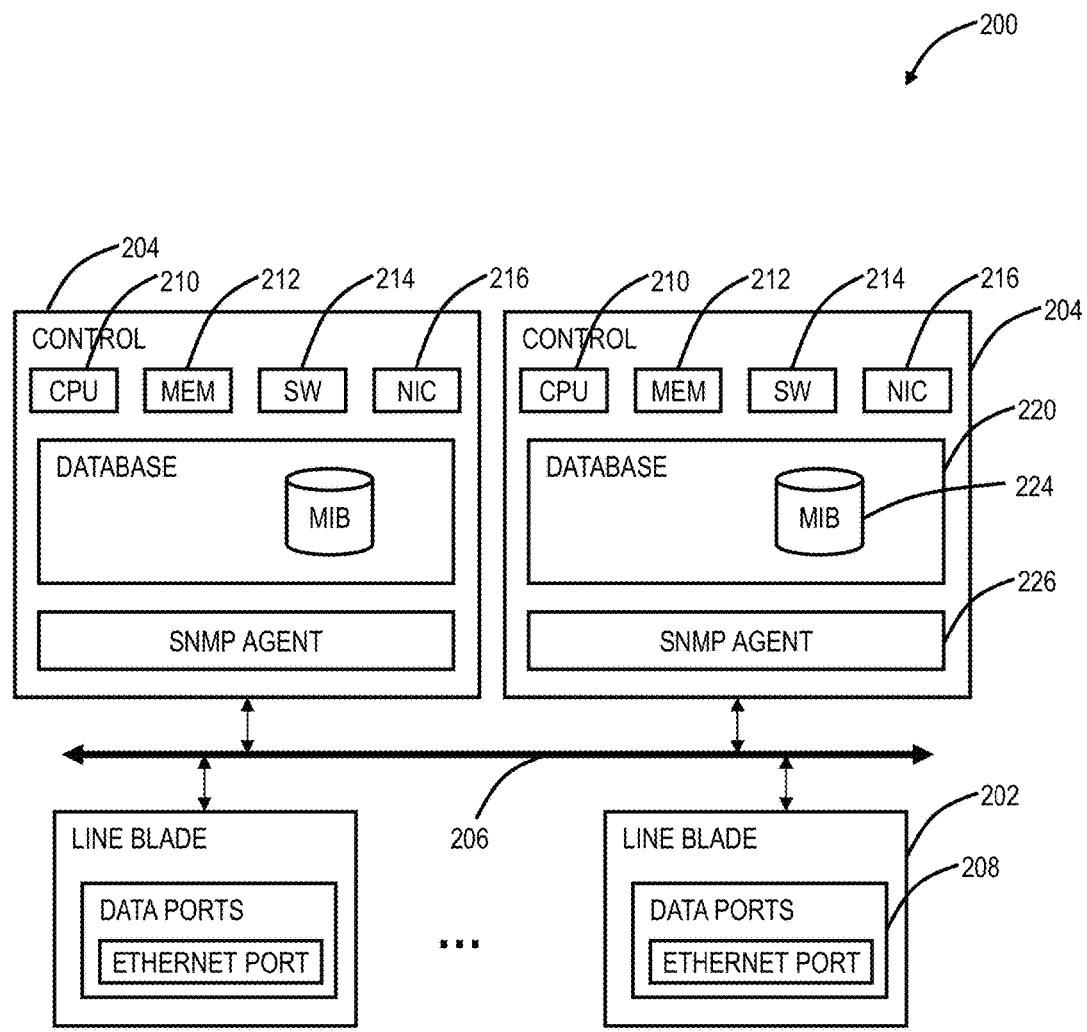
FIG. 2 is a block diagram of an exemplary implementation of a network element such as for the MEP and/or the MIP in the network of FIG. 1.

Referring to FIG. 2, in an exemplary embodiment, a block diagram illustrates an exemplary implementation of a network element 200 such as for the MEP 102, 104 and/or the MIP 106 in the network 100. In this exemplary embodiment, the network element 200 is an Ethernet network switch for illustration purposes, but those of ordinary skill in the art will recognize the systems and methods described herein contemplate other types of network elements and other implementations. In this exemplary embodiment, the network element 200 includes a plurality of blades 202, 204 interconnected via an interface 206. The blades 202, 204 are also known as line cards, line modules, circuit packs, pluggable modules, etc. and generally refer to components mounted within a chassis, shelf, etc. of a data switching device, i.e. the network element 200. Each of the blades 202, 204 may include numerous electronic devices and/or optical devices mounted on a circuit board along with various interconnects including interfaces to the chassis, shelf, etc. Two exemplary blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Further, the control blades 204 may include a Simple Network Management Protocol (SNMP) Agent 226 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200. Additionally, the control blades 204 may be configured to provide CFM as described herein.

Note, as described herein, the network element 200 is a physical network device that provides network services that utilize OAM. In other exemplary embodiments, the systems and methods described herein also contemplate operation with virtual devices performing network functions, such as Virtual Network Functions (VNFs) and the like. The virtual devices can provide similar functionality as the network element 200 but are realized in a virtualized environment such as operating on compute resources on a Virtual Machine (VM), software container, etc. Network operators are expanding Network Functions Virtualization (NFV) deployments, and it is expected OAM sessions will be required for both physical network elements 200 and virtual VNFs.

Logical Network Device

Figure 3:
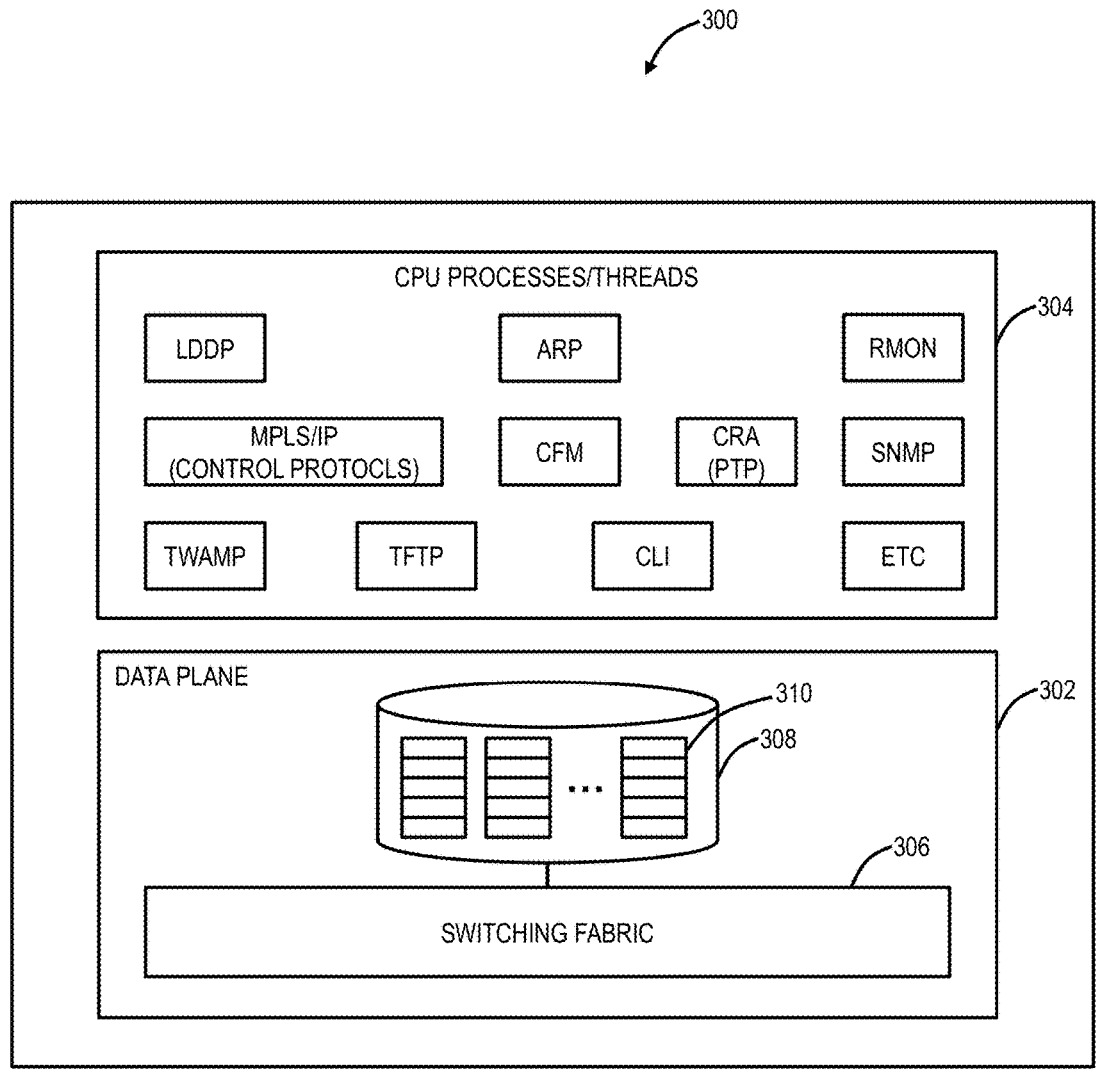
FIG. 3 is a block diagram of a logical network device.

Referring to FIG. 3, in an exemplary embodiment, a block diagram illustrates a logical network device 300. The network device 300 can be the network element 200, the MEPs 102, 104, the MIP 106, a VNF, or the like. The logical network device 300 is presented to illustrate OAM measurements and associated scaling problems. The network device 300 generally includes a data plane 302 and a processes/threads 304 (a control plane) executed on one or more processors. The data plane 302 can include a switching fabric 306 (either physical or virtualized) configured to switch packets and one or more queues 308 for OAM PDUs 310. Those skilled in the art will recognize the network device 300 may include various other functions which are omitted for illustration purposes. The OAM PDUs 310 are provided to perform functions for the OAM sessions supported by the network device 300 for associated services. For processing the OAM PDUs 310, e.g., transmitting, receiving, and analyzing, the processes/threads 304 are executed.

The processes/thread 304 can include, without limitation, Link Layer Discovery Protocol (LLDP), Address Resolution Protocol (ARP), Remote Network MONitoring (RMON), MPLS/IP control protocols, CFM, Configuration Recovery Adapter (CRA)/Precision Time Protocol (PTP), Simple Network Management Protocol (SNMP), Two-Way Active Measurement Protocol (TWAMP), Trivial File Transfer Protocol (TFTP), Command Line Interface (CLI). Due to processing, memory, and other limitations for the processes/threads 304, the number of CFM OAM sessions supported may be less than the number of network services supported by the network device 300, via the switching fabric 306.

Figure 4:
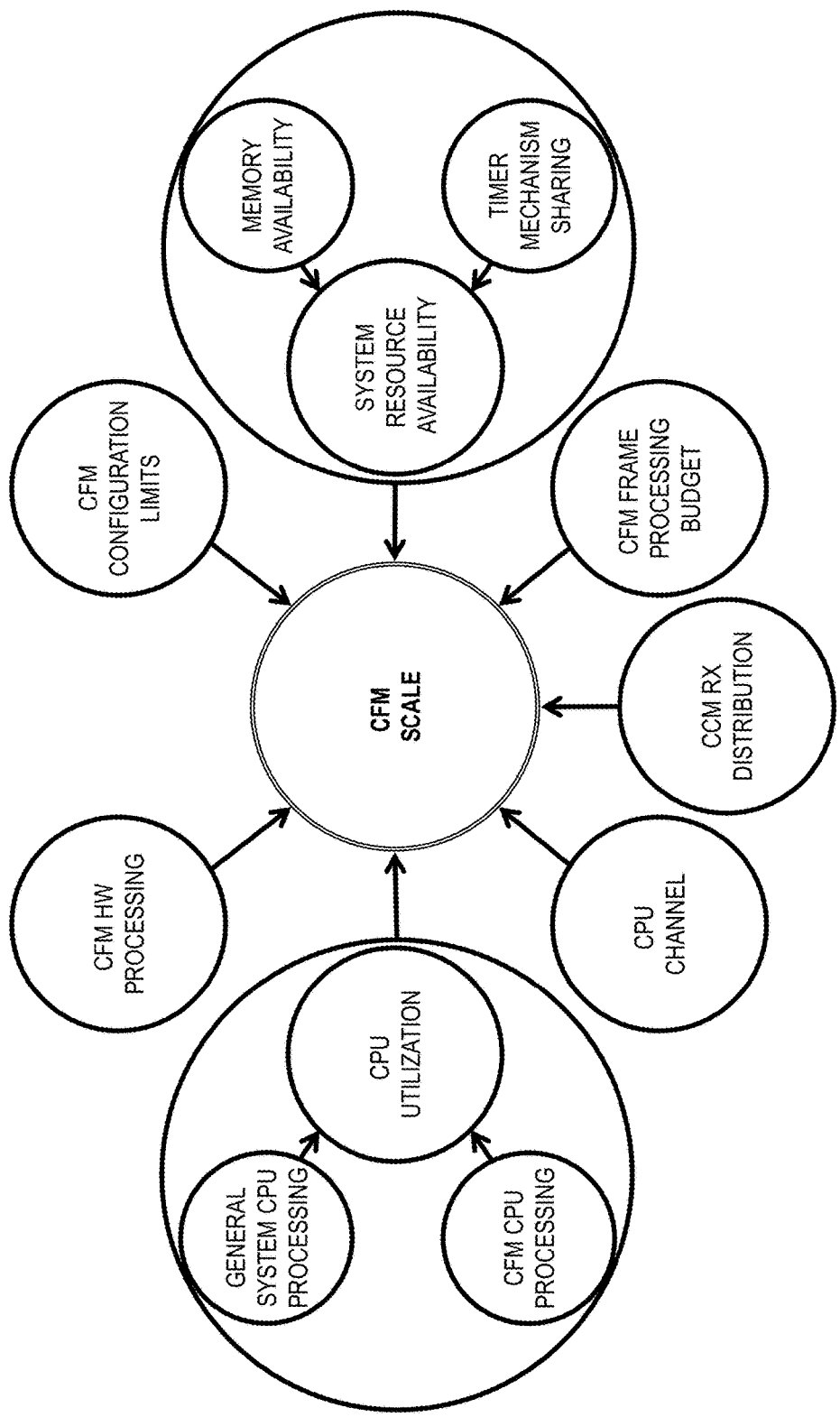
FIG. 4 is a diagram of various considerations for CFM OAM scaling in the network device.

Referring to FIG. 4, in an exemplary embodiment, a diagram illustrates various considerations for CFM OAM scaling in the network device 300. For example, CFM frames are limited by CPU processing and utilization in the processes/threads 304, by the channel capacity in the processes/threads 304, by CFM hardware processing, CCM distribution, CFM frame processing budget, CFM configuration limits, system resource availability, and the like.

Exemplary EVC CFM/Y.1731 Session Profile

In an exemplary embodiment, the network device 300 can support a first OAM session profile for Ethernet Virtual Circuit (EVC) CFM/Y.1731 and a second OAM session profile. The first OAM session profile can include one CCCM at 10 sec. intervals, 6 (per CoS) DMM/DMR sessions at 1 sec. intervals, and 6 (per CoS) Synthetic Loss Messages (SLM)/Synthetic Loss Reply (SLR) sessions at 1 sec. intervals. The second OAM session profile can include one CCCM at 10 sec. intervals, 1 (per CoS) DMM/DMR sessions at 1 sec. intervals, and 1 (per CoS) Synthetic Loss Messages (SLM)/Synthetic Loss Reply (SLR) sessions at 1 sec. intervals. Of course, other OAM session profiles are contemplated.

The first OAM session profile, the second OAM session profile, and other session profiles are each associated with a network service. As described herein, the first OAM session profile, the second OAM session profile, and other session profiles can be a service set, and the service sets for each network service can be partitioned into a plurality of sets. At the end of each measurement window, the next service partitioned set OAM sessions are run, for its measurement window. This continues until the complete set of services have their OAM sessions executed.

Measurement Windows and Partitioning

Figure 5:
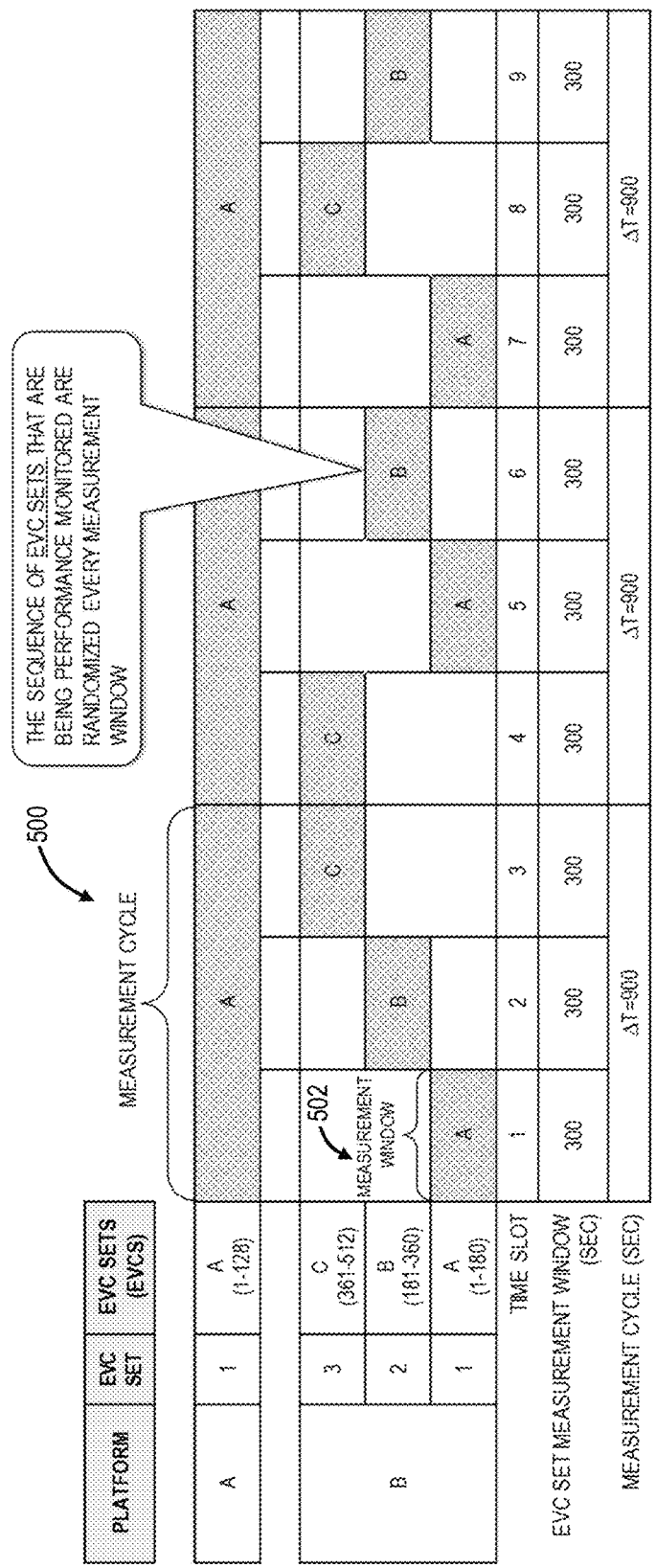
FIG. 5 is a table of the staggering technique via a measurement cycle with one or more measurement windows.

Referring to FIG. 5, in an exemplary embodiment, a table illustrates the staggering technique via a measurement cycle 500 with one or more measurement windows 502. For example, the table illustrates different platforms A, B (i.e., network functions or network elements) which have differing service and OAM session scaling properties. As described herein, the network device 300 can be referred to as a network function. The network function, based upon internal scaling calculations, computes partitions (i.e., service sets) where the concurrent and simultaneous OAM sessions are run. For example, for the platform A, there is a single partition of an EVC set 1A with OAM sessions 1-128, and, for the platform B, there are three partitions of EVC sets 1A, 2B, 2C with OAM sessions 1-80, 181-360, 361-512, respectively. Note, the platform B can support more OAM sessions than the platform A. The measurements are made over the measurement window 502 and stored by the network function. The OAM sessions associated with the next service set are then executed. All service sets need to complete within the measurement cycle 500. At the end of the measurement cycle 500, a [northbound] management system (e.g., the management system 110) has the opportunity to retrieve the performance monitoring metrics from the network function. Also, the sequence of the EVC sets that are being performed can be randomized in each of the measurement windows 502.

The staggering technique allows simultaneous CFM/Y.1731 sessions to be run across a discrete set of EVCs, with the measurement window 502 (e.g., every 300 sec. or some other value). For example, in order to provide CFM/Y.1731 measurement reading across 512 services within a 15 min binning period for the platform B, due to platform scaling ceiling, every 300 sec. a sequential incremental set of EVC measurements (e.g., 180) will be made. In this example, for the platform B, there are three measurement windows 502 in each measurement cycle 500 with the measurement windows 502 each being 300 sec. and the total measurement cycle 500 being 900 sec.

The network function hides the complexity of the staggering and partitioning of the services for which the OAM session needs to be run. Over time (i.e., from a statistical perspective), the performance monitoring results for each service will be representative to the actual real-time measurements for the services. Essentially, the network function will automatically define a set of service sets (i.e., groupings/partitions of services) over which the OAM sessions can concurrently be run simultaneously within the scaling characteristics of the platform. Additionally, the network function, once provided with the overall measurement cycle 500 (which is the period of time the northbound management system will take to retrieve the performance monitoring data), will automatically define the measurement window 502 that can be used to run each service set.

Additional manifestations of this scheme include the ability to categorize services that will and will not be included in the staggering and partitioning. Services that are not included in the staggering will get OAM monitored persistently throughout the measurement cycle 500. The other services would then get a staggered OAM monitoring experience.

Monitoring Distribution

Figure 6:
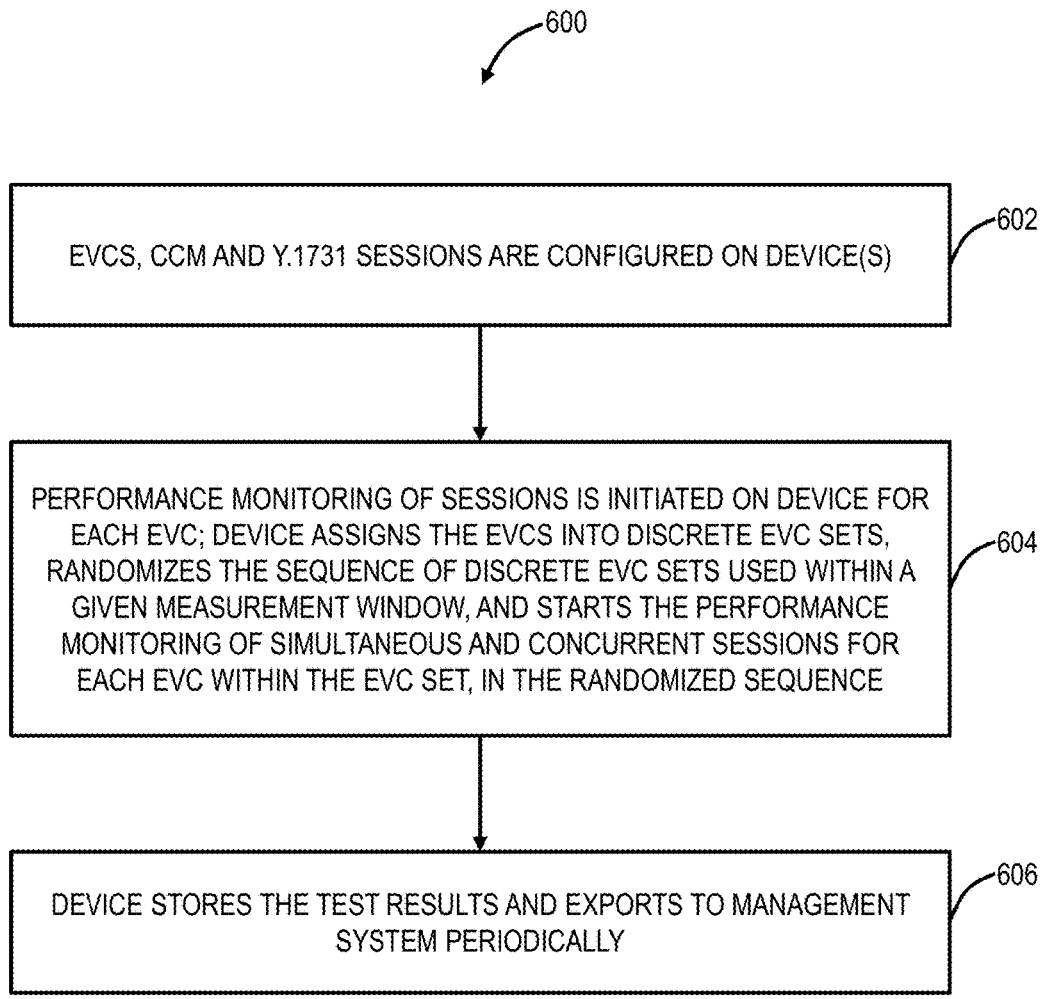
FIG. 6 is a flowchart of an OAM scaling session process.

Referring to FIG. 6, in an exemplary embodiment, a flowchart illustrates an OAM scaling session process 600. First, EVCs, CCM, and Y.1731 sessions are configured on the device(s) (step 602). The sessions can be configured via a template through the management system 110 based on a new EVC request. The device initiates performance monitoring of sessions on the device for each EVC (step 604). Specifically, based on a defined measurement cycle 500 in the device (e.g., 15 min., etc.) or based on the configuration of the measurement cycle 500, the network device assigns the EVCs (and the associated OAM (Y.1731) sessions) into discrete EVC sets. This is a per-EVC assignment, not per-session. The device can randomize a sequence of discrete EVC sets to be used within a given measurement window 502, and the device starts the performance monitoring of simultaneous and concurrent sessions for each EVC within the EVC set, in the randomized sequence. The randomization can be ensured based on a truly random sequence. Finally, the device stores the test results and exports to the management system 110 periodically (step 606).

Referring to FIG. 7, in an exemplary embodiment, a table illustrates a measurement cycle 500 with three measurement windows 502 similar to the table of FIG. 5. The objective of the OAM scaling session process 600 is to balance the number of sessions in each time slot (measurement window 502). Based on this balancing, the device can decide which EVC set each new EVC is assigned to. For example, if an EVC has the first OAM session profile, it would have 12 sessions added into the time slot (i.e., 6 DMM/DMR sessions at 1 sec. intervals and 6 SLM/SLR sessions at 1 sec. intervals), and, if an EVC has the second OAM session profile, it would have 2 sessions added into the time slot (i.e., 1 DMM/DMR session at 1 sec. intervals and 1 SLM/SLR session at 1 sec. intervals). That is, the DMM/DMR sessions and SLM/SLR sessions are included in the staggering technique, whereas the CCMs are excluded. The OAM scaling session process 600 can be performed locally by the network device.

The network device has the following information:

Let E represent the number of EVCs have configured on the device;

Let $M_c$ represent the measurement cycle 502, in seconds (provided by the management system 100 or in the device base configuration); and Let represent the performance monitoring session scale of services which is $$S_p = Int\left(\frac{CFM\ Frame\ Processnig\ Budget}{2\times\left(\frac{\#of\ CCMsessions}{CCMInterval} + \frac{\#of\ DMMsessions}{DMMInterval} + \frac{\#of\ SLMsessions}{SLMInterval}\right)}\right)$$

The aforementioned values E, $M_c$, and $S_p$ are known by the device and based thereon, the device can derive the following:

Let $ES_i$ represent an EVC set;

Let $N_E$ represent the (maximum) number of EVCs within a given EVC set which is:

$N_E = Int(90\% \times S_p)$

Let $ES_N$ represent the number of EVC sets which is:

$$ES_N = RoundUp\left(\frac{E}{N_E}\right)$$

Let $M_w$ represent the measurement window for each EVC set, within a measurement cycle ($M_c$) which is:

$$M_W = RoundUp\left(\frac{M_C}{ES_N}\right)$$

Let RS represent the randomized sequence of EVC sets, which is computed every measurement window ($M_w$).

The following table illustrates an exemplary timeline.

| | | $M_c$ 900 | | | |
|---|---|---|---|---|---|
| Cycle # | Services with first OAM session profile | Services with second OAM session profile | $M_w$ (sec) | $ES_n$ | S (%-age) |
| 0 | 64 | 0 | 900 | 1 | 34.1% |
| 1 | 64 | 32 | 900 | 1 | 37.0% |
| 2 | 204 | 32 | 450 | 2 | 111.6% |
| 3 | 400 | 32 | 300 | 3 | 215.9% |
| 4 | 512 | 32 | 300 | 3 | 275.5% |
| 5 | 512 | 32 | 300 | 3 | 275.5% |
| 6 | 512 | 32 | 300 | 3 | 275.5% |
| 7 | 512 | 32 | 300 | 3 | 275.5% |
| 8 | 512 | 32 | 300 | 3 | 275.5% |
| 9 | 512 | 32 | 300 | 3 | 275.5% |
| 10 | 512 | 32 | 300 | 3 | 275.5% |

Again, the measurement cycle $M_c$ 500 is provided by the device (or added to the device base configuration). The above table includes an exemplary measurement cycle $M_c$ 500 of 900 sec. Every measurement cycle ($M_c$), the device can re-compute the measurement window ($M_w$) and the number of EVC sets within the next $M_c$. This computation examines the aggregate services (both sessions with the first OAM session profile and the second OAM session profile) that are configured on the device at the measurement cycle increment. The implication is that the monitoring of newly added services does not get started until the beginning of the next measurement cycle (at the earliest).

The table includes columns for the sessions with the first OAM session profile and the second OAM session profile. Of course, other OAM session profiles are contemplated, and these are merely presented for illustration purposes. $ES_n$ is the number of EVC set (or time slots) used within this measurement cycle ($M_c$). In the first two cycles, there are enough sessions to fully perform these sessions without the staggering technique. However, from cycle 3 and beyond, the staggering technique is required to support all of the OAM sessions. So, when the staggering technique is not used, there is only one EVC set with all of the sessions with a measurement window ($M_w$) of 900 sec. (when there is only one EVC set, the measurement window ($M_w$) equals the measurement cycle ($M_c$)). In cycle 3, there are two EVC sets and the measurement window ($M_w$) is set at 450 sec., half of the measurement cycle ($M_c$) so that each of the EVC sets can be handled over the measurement cycle ($M_c$). In cycles 4 and beyond, there are three EVC sets and the measurement window ($M_w$) is set at 300 sec., one-third of the measurement cycle ($M_c$) so that each of the EVC sets can be handled over the measurement cycle ($M_c$).

Finally, the last column (S) represents a scale which is an internal value determined by the network device. The scale (S) represents the scaling demands associated with the configured services (with their respective CFM and Y.1731 sessions profiles applied). For example, things like the device CFM frame processing budget, CFM service scaling, etc. are factored in, to compute this value. If the value exceeds 100%, then additional EVC sets ($ES_n$) are required, and thus the measurement window ($M_w$) needs to be re-assessed. Each $ES_i$ (EVC set instance) can support at most a 100% of the services and simultaneous and concurrent CFM/Y.1731 session profiles. Also, CFM/Y.1731 processing room needs to be reserved within each $ES_i$ to support on-demand sessions (e.g., for troubleshooting).

Figure 8:
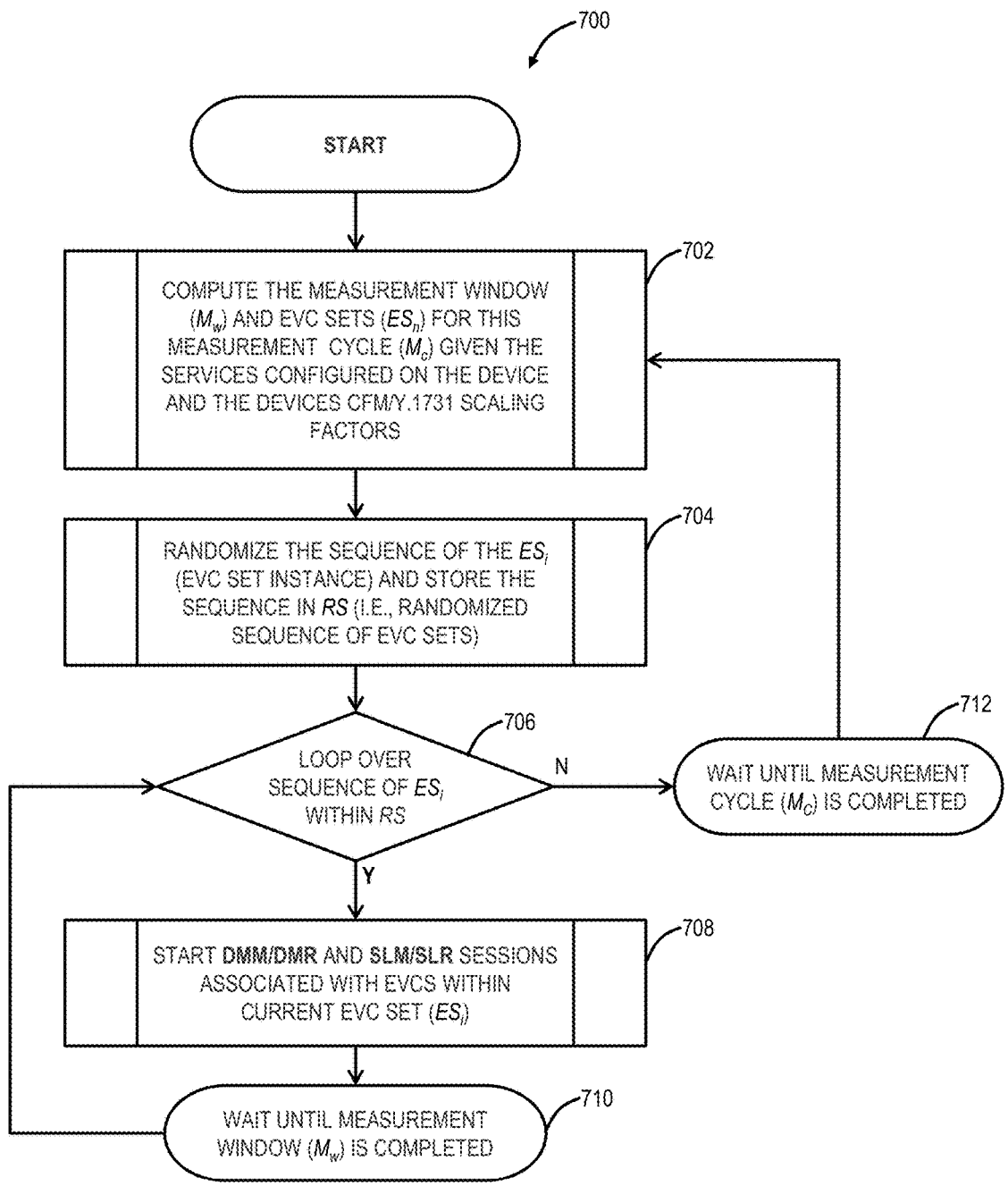
FIG. 8 is a flowchart of a device processing process implemented by a network device to perform OAM session scaling.

Referring to FIG. 8, in an exemplary embodiment, a flowchart illustrates a device processing process 700 implemented by a network device to perform OAM session scaling. The device processing process 700 is implemented by the physical network element 200, a virtual network element (VNF), the network device 300, etc. The device processing process 700 includes computing the measurement window ($M_w$) and EVC sets ($ES_n$) for this measurement cycle ($M_c$) given the services configured on the device and the devices CFM/Y.1731 scaling factors (step 702). The device processing process 700 includes randomizing the sequence of the $ES_i$ and stores the sequence in a Randomized Sequence (RS) of EVC sets (step 704). For a current EVC set ($ES_n$), the device processing process 700 loops over the sequence of the $ES_i$ within the RS (step 706), starts OAM session measurements (e.g., DMM/DMR and SLM/SLR sessions) associated with EVCs within the current EVC set (step 708), and waits unit the measurement window ($M_w$) is completed (step 710). Once the measurement cycle (Mc) is completed (step 712), the device processing process 700 returns to step 702.

OAM Scaling Process

Figure 9:
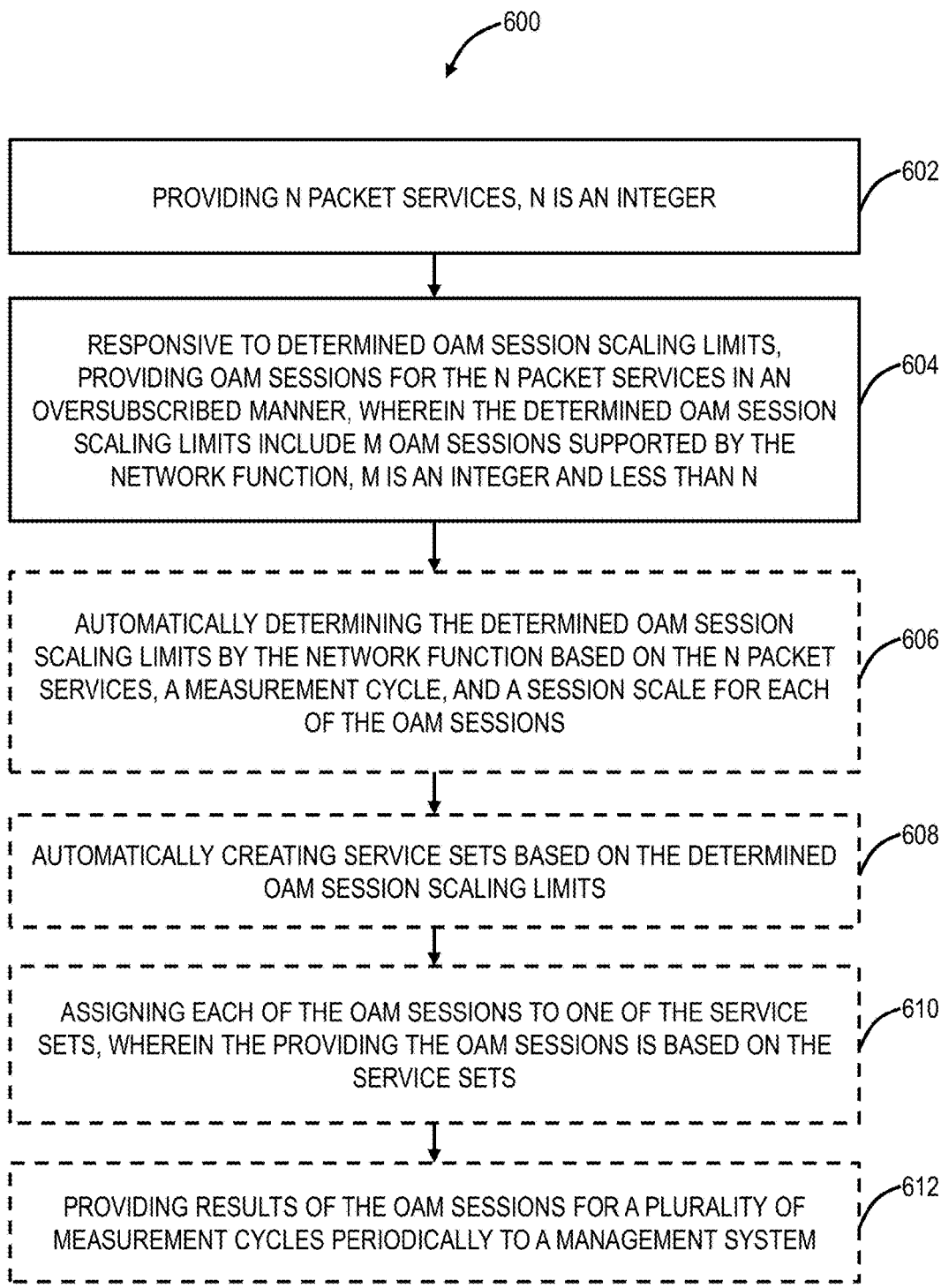
FIG. 9 is a flowchart of an OAM process implemented by a network function performed by one of a physical network element and a virtual network element executed on one or more processors.

Referring to FIG. 9, in an exemplary embodiment, a flowchart illustrates an OAM process 800 implemented by a network function performed by one of a physical network element and a virtual network element executed on one or more processors. The OAM process 800 includes providing N packet services, N is an integer (step 602); and, responsive to determined OAM session scaling limits, providing OAM sessions for the N packet services in an oversubscribed manner, wherein the determined OAM session scaling limits include M OAM sessions supported by the network function, M is an integer and less than N (step 604).

The OAM process 800 can further include automatically determining the determined OAM session scaling limits by the network function based on the N packet services, a measurement cycle, and a session scale for each of the OAM sessions (step 606). The OAM sessions can include one or more delay measurements and loss measurements performed through associated Packet Data Unit (PDUs). The OAM process 800 can further include automatically creating service sets based on the determined OAM session scaling limits (step 608); and assigning each of the OAM sessions to one of the service sets, wherein the providing the OAM sessions is based on the service sets (step 610). The assigning can be performed to balance a number of the OAM sessions in each of the service sets.

The OAM process 800 can further include providing results of the OAM sessions for a plurality of measurement cycles periodically to a management system (step 612). The providing the OAM sessions can include performing each of the OAM sessions in each of the service sets over an associated measurement window in a first measurement cycle; and performing each of the OAM sessions in a different order in a second measurement cycle. The different order can include one or more of performing each of the service sets in a different time slot in the second measurement cycle and performing each of the OAM sessions in an associated service set in a different order between the first measurement cycle and the second measurement cycle.

The OAM sessions can include a first set of OAM sessions and a second set of OAM sessions, wherein the providing the OAM sessions can include providing the first set of OAM sessions in the oversubscribed manner, and the OAM process 800 can further include providing the second set of OAM sessions in a non-oversubscribed manner.

In another exemplary embodiment, the network device 300 is configured to perform OAM scaling. The network device 300 includes a data plane 302 configured to switch packets; and a control plane 304 communicatively coupled to the data plane 302, wherein the control plane includes one or more processors configured to manage N packet services, N is an integer; and, responsive to determined OAM session scaling limits, manage OAM sessions for the N packet services in an oversubscribed manner, wherein the determined OAM session scaling limits include M OAM sessions supported by the network function, M is an integer and less than N.

In a further exemplary embodiment, an OAM scaling apparatus associated with a network function performed by one of a physical network element and a virtual network element executed on one or more processors includes circuitry configured to provide N packet services, N is an integer; and circuitry configured to provide OAM sessions for the N packet services in an oversubscribed manner responsive to determined OAM session scaling limits, wherein the determined OAM session scaling limits include M OAM sessions supported by the network function, M is an integer and less than N.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Operations, Administration, and Maintenance (OAM) scaling method performed by one of a physical network element and a virtual network element executed on one or more processors, the OAM scaling method comprising:
   providing N packet services, N is an integer;
   automatically determining OAM session scaling limits by a network function based on one or more of a value of N, a measurement cycle, and a session scale for each of M OAM sessions; and
   responsive to the determining of the OAM session scaling limits, providing the M OAM sessions for the N packet services in an oversubscribed manner, wherein the OAM session scaling limits determine a value of M supported by the network function, M is an integer and less than N.

2. The OAM scaling method of claim 1, wherein the M OAM sessions comprise one or more delay measurements and loss measurements performed through associated Packet Data Unit (PDUs).

3. The OAM scaling method of claim 1, further comprising
   creating service sets based on the OAM session scaling limits; and
   assigning each of the M OAM sessions to one of the service sets, wherein the providing the M OAM sessions is based on the service sets.

4. The OAM scaling method of claim 3, wherein the assigning is performed to balance a number of the M OAM sessions in each of the service sets.

5. The OAM scaling method of claim 3, further comprising
   providing results of the M OAM sessions for a plurality of measurement cycles to a management system.

6. The OAM scaling method of claim 3, wherein the providing the OAM sessions comprises
   performing each of the M OAM sessions in each of the service sets over an associated measurement window in a first measurement cycle; and
   performing each of the M OAM sessions in a different order in a second measurement cycle.

7. The OAM scaling method of claim 6, wherein the different order comprises one or more of performing each of the service sets in a different time slot in the second measurement cycle and performing each of the M OAM sessions in an associated service set in a different order between the first measurement cycle and the second measurement cycle.

8. The OAM scaling method of claim 1, wherein the M OAM sessions comprise a first set of OAM sessions and a second set of OAM sessions, wherein the providing the M OAM sessions comprises providing the first set of OAM sessions in the oversubscribed manner, and the method further comprising
   providing the second set of OAM sessions in a non-oversubscribed manner.

9. A network device configured to perform Operations, Administration, and Maintenance (OAM) scaling, the network device comprises:
   a switching fabric configured to switch packets; and
   a control plane communicatively coupled to the switching fabric, wherein the control plane comprises one or more processors configured to
   manage N packet services, N is an integer;
   automatically determine OAM session scaling limits by a network function based on one or more of a value of N, a measurement cycle, and a session scale for each of M OAM sessions; and
   responsive to the determining of the OAM session scaling limits, manage the M OAM sessions for the N packet services in an oversubscribed manner, wherein the OAM session scaling limits determine a value of M supported by the network function, M is an integer and less than N.

10. The network device of claim 9, wherein the M OAM sessions comprise one or more delay measurements and loss measurements performed through associated Packet Data Unit (PDUs).

11. The network device of claim 9, wherein the control plane comprises one or more processors configured to
   create service sets based on the OAM session scaling limits; and
   assign each of the M OAM sessions to one of the service sets, wherein the M OAM sessions are managed based on the service sets.

12. The network device of claim 11, wherein each of the M OAM sessions is assigned to balance a number of the M OAM sessions in each of the service sets.

13. The network device of claim 11, wherein the control plane comprises one or more processors configured to
   provide results of the M OAM sessions for a plurality of measurement cycles to a management system.

14. The network device of claim 11, wherein, for management of the M OAM sessions, wherein the control plane comprises one or more processors configured to
   perform each of the M OAM sessions in each of the service sets over an associated measurement window in a first measurement cycle; and
   perform each of the M OAM sessions in a different order in a second measurement cycle.

15. The network device of claim 13, wherein the different order comprises one or more of performing each of the service sets in a different time slot in the second measurement cycle and performing each of the M OAM sessions in an associated service set in a different order between the first measurement cycle and the second measurement cycle.

16. The network device of claim 9, wherein the M OAM sessions comprise
a first set of OAM sessions and a second set of OAM sessions, wherein the first set of OAM sessions are managed in the oversubscribed manner, and wherein the control plane comprises one or more processors configured to
manage the second set of OAM sessions in a non-oversubscribed manner.

17. A network device configured to perform Operations, Administration, and Maintenance (OAM) scaling, the network device comprises:
a switching fabric configured to switch packets; and
a control plane communicatively coupled to the switching fabric, wherein the control plane comprises one or more processors configured to
manage N packet services, N is an integer;
responsive to determined OAM session scaling limits, manage M OAM sessions for the N packet services in an oversubscribed manner, wherein the determined OAM session scaling limits determine a value of M supported by a network function, M is an integer and less than N;
create service sets based on the determined OAM session scaling limits; and
assign each of the M OAM sessions to one of the service sets, wherein the M OAM sessions are managed based on the service sets.

18. The network of claim 17, wherein the control plane comprises one or more processors configured to
determine the determined OAM session scaling limits by the network function based one or more of a value of N, a measurement cycle, and a session scale.

19. The network device of claim 18, wherein each of the M OAM sessions is assigned to balance a number of the M OAM sessions in each of the service sets.

20. The network device of claim 18, wherein the control plane comprises one or more processors configured to
provide results of the M OAM sessions for a plurality of measurement cycles to a management system.

* * * * *